United States Patent
Ramani et al.

(10) Patent No.: US 7,105,107 B2
(45) Date of Patent: Sep. 12, 2006

(54) USE OF NONMICROPOROUS SUPPORT FOR SYNGAS CATALYST

(75) Inventors: Sriram Ramani, Ponca City, OK (US); Yi Jiang, Ponca City, OK (US); Harold A. Wright, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 223 days.

(21) Appl. No.: 10/743,855

(22) Filed: Dec. 22, 2003

(65) Prior Publication Data
US 2004/0142815 A1    Jul. 22, 2004

Related U.S. Application Data

(60) Provisional application No. 60/437,124, filed on Dec. 30, 2002, provisional application No. 60/437,071, filed on Dec. 30, 2002.

(51) Int. Cl.
*C01B 3/36*   (2006.01)
*C01B 3/40*   (2006.01)

(52) U.S. Cl. .............. 252/373; 502/325; 502/337

(58) Field of Classification Search ............ 252/373
See application file for complete search history.

(56) References Cited

U.S. PATENT DOCUMENTS

| | | | |
|---|---|---|---|
| 5,036,032 A | 7/1991 | Iglesia et al. | |
| 5,597,771 A | 1/1997 | Hu et al. | |
| 6,281,385 B1 | 8/2001 | Ruedinger et al. | |
| 6,488,907 B1 * | 12/2002 | Barnes et al. | 423/418.2 |
| 2002/0035033 A1 | 3/2002 | Muller et al. | |

OTHER PUBLICATIONS

U.S. Appl. No. 60/437,124, filed Oct. 30, 2002, Ramani et al.
U.S. Appl. No. 60/437,071, filed Dec. 30, 2002, Espinoza.
Milind S. Kulkarni et al.; "Periodic Operation of Asymmetric Bidirectional Fixed-Bed Reactors with Temperature Limitations"; Ind. Eng. Chem. Res. 1998; pp. 770-781; vol. 37, no month.
Levenspiel, O., *The Chemical Reactor omnibook*, Ore. St. Univ. Bookstores (Jun. 1996).
E. Peluso et al., *Eggshell Catalyst in Fischer-Tropsch Synthesis Intrinsic Reaction Kinetics*, Chemical Engineering Science 56 (2001) pp. 1239-1245, no month.
Enrique Iglesia et al., *Synthesis and Catalytic Properties of Eggshell Cobalt Catalysts for the Fischer-Tropsch Synthesis*, Topics in Catalysis 2 (1995) pp. 17-27, no month.
K.L. Hohn et al., *Partial Oxidation of Methane to Syngas at High Space Velocities over Rh Coated Spheres*, Applied Catalysis A: General 211 (2001) pp. 53-68, no month.

* cited by examiner

*Primary Examiner*—Wayne A. Langel
(74) *Attorney, Agent, or Firm*—Conley Rose P.C.

(57) ABSTRACT

A method is disclosed for converting light hydrocarbons (e.g. methane or natural gas) to synthesis gas employing a nonmicroporous, thin shell catalyst that catalyzes a net partial oxidation reaction. Certain preferred catalysts comprise a thin outer layer comprising at least one catalytically active metal disposed on a discrete nonmicroporous support structure. A preferred thin shell catalyst has an effectiveness factor greater than 0.1 when utilized in a partial oxidation reaction.

24 Claims, 1 Drawing Sheet

USE OF NONMICROPOROUS SUPPORT FOR SYNGAS CATALYST

RELATED APPLICATIONS

The present invention is a continuation-in-part of U.S. Provisional Application Ser. No. 60/437,124, filed Dec. 30, 2002, and entitled "Use of Nonmicroporous Support for Syngas Catalyst," which is incorporated herein in its entirety. This application is related to concurrently filed and commonly owned U.S. application Ser. No. 60/437,071, filed Dec. 30, 2002, entitled "Improved Catalysts for the Conversion of Methane to Synthesis Gas."

STATEMENT REGARDING FEDERALLY SPONSORED RESEARCH OR DEVELOPMENT

None.

FIELD OF THE INVENTION

The present invention generally relates to catalysts and processes for catalytically converting light hydrocarbons (e.g., natural gas) to synthesis gas. More particularly, the invention relates to nonmicroporous, thin shell catalysts that are active for catalyzing the net partial oxidation of natural gas or methane to CO and H2.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes. Present day industrial use of methane as a chemical feedstock typically proceeds by the initial conversion of methane to carbon monoxide and hydrogen by either steam reforming, which is the most widely used process, or by dry reforming. Steam reforming proceeds according to Equation 1.

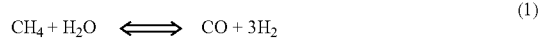
$$CH_4 + H_2O \rightleftharpoons CO + 3H_2 \quad (1)$$

Although steam reforming has been practiced for over five decades, efforts to improve the energy efficiency and reduce the capital investment required for this technology continue.

The partial oxidation of hydrocarbons, e.g., natural gas or methane is another process that has been employed to produce syngas. While currently limited as an industrial process, partial oxidation has recently attracted much attention due to significant inherent advantages, such as the fact that significant heat is released during the process, in contrast to the steam reforming processes, which are endothermic. Partial oxidation of methane proceeds exothermically according to the following reaction stoichiometry:

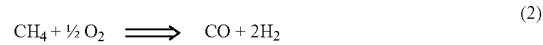
$$CH_4 + \tfrac{1}{2}O_2 \implies CO + 2H_2 \quad (2)$$

In the catalytic partial oxidation (CPOX) processes, natural gas is mixed with air, oxygen or oxygen-enriched air, and is introduced to a catalyst at elevated temperature and pressure. The partial oxidation of methane yields a syngas mixture with a H2:CO ratio of about 2:1, as shown in Equation 2. This ratio is more useful than the H2:CO ratio from steam reforming for the downstream conversion of the syngas to chemicals such as methanol and to fuels. Furthermore, oxidation reactions are typically much faster than reforming reactions. This makes possible the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by the existing catalytic partial oxidation processes have placed these processes generally outside the limits of economic justification.

A number of process regimes have been described in the literature for the production of syngas via catalyzed partial oxidation reactions. The noble metals, which typically serve as the best catalysts for the partial oxidation of methane, are scarce and expensive. The more widely used, less expensive, catalysts have the disadvantage of promoting coke formation on the catalyst during the reaction, which results in loss of catalytic activity. Moreover, in order to obtain acceptable levels of conversion of gaseous hydrocarbon feedstock to CO and H2 it is typically necessary to operate the reactor at a relatively low flow rate, or space velocity, using a large quantity of catalyst. For successful operation at commercial scale, however, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbonaceous deposits ("coke") on the catalyst, which severely reduces catalyst performance.

As a result, substantial effort has been devoted in the art to the development of economical catalysts allowing commercial performance without coke formation. Not only is the choice of the catalyst's chemical composition important, the physical structure of the catalyst and catalyst support structures must possess mechanical strength, in order to function under operating conditions of high pressure and high flow rate of the reactant and product gasses.

Of the methods that employ catalysts for oxidative conversion of methane, to syngas, typically catalytic metals are dispersed throughout a porous support. The porous support provides longitudinal channels or passageways that permit high space velocities with a minimal pressure drop. In ideal conditions, the catalytic metals are dispersed throughout the porous channels and promote further conversion.

The use of supports with internal pores can lead to insufficient use of catalyst because (i) the reactants do not have enough time to reach catalytic metals in the pores and (ii) the reactants may become trapped in the pores and interact in undesired secondary reactions during the diffusion of CO and $H_2$ from the pores. Mass transfer rates can indeed control the rate of conversion, especially in short contact reactors.

Accordingly, there is a continuing need for better, more economical processes and catalysts for the catalytic partial oxidation of hydrocarbons, particularly methane, or methane containing feeds, in which the catalyst retains a high level of activity and selectivity to carbon monoxide and hydrogen under conditions of high gas space velocity and elevated pressure.

U.S. Pat. No. 6,281,385 discloses a process for preparing acetic acid by gas-phase oxidation of saturated $C_4$-hydrocarbons and their mixtures with unsaturated $C_4$-hydrocarbons in a tube reactor using a coated catalyst comprising an inert nonporous support body and a catalytically active mixed oxide composition comprising (a) one or more oxides selected from the group consisting of titanium dioxide, zirconium dioxide, tin dioxide and aluminum oxide and (b) from 0.1% to 1.5% by weight, based on the weight of the component (a) and per $m^2/g$ of specific surface area of the component (a), of vanadium pentoxide applied to the outer surface of the support body, wherein a gas mixture comprising oxygen or oxygen-containing gas, one or more $C_4$-hydrocarbons and water vapor and having a $C_4$-hydrocarbon/air (oxygen) volume ratio of from 0.2/99.8 to 25/75 and a $C_4$-hydrocarbon/water vapor volume ratio of from 1/1 to 1/60 is reacted over the coated catalyst at a temperature of from 100° C. to 400° C. and a gauge pressure of from 0.2 to 50 bar.

U.S. published application No. 2002/0035033 discloses a process for preparing a shell-type catalyst which comprises applying to a substantially nonporous inorganic support material having a BET surface area of <80 $m^2/g$, a catalytically active outer shell of a suspension containing at least one water soluble noble metal compound and a substantially water insoluble coating compound, drying the suspension onto the support material, and activating the coated support material in a reducing gas stream.

Despite these teachings, there remains a need for a catalyst system that is effective for carrying out fast partial oxidation reactions such as CPOX and oxidative dehydrogenation (ODH).

SUMMARY OF THE INVENTION

In order to operate at very high flow rates, high pressure and using short contact time CPOX reactors, the catalysts should be highly active, have excellent mechanical strength, resistance to rapid temperature fluctuations and thermal stability at partial oxidation reaction temperatures.

The catalysts and methods of the present invention overcome some of the drawbacks of existing catalysts and processes for converting light hydrocarbons to syngas. The new nonmicroporous, thin shell catalysts are more stable and give higher syngas yield than conventional syngas catalysts under conditions of high gas space velocity and elevated pressure. The term "nonmicroporous" is defined as having 10% or less of the surface area of the support in the form of micropores, where "micropore" is defined as a pore that is less than 1 nanometer (nm) in diameter. Therefore, the catalysts of the present invention are substantially free of pores less than 1 nm in diameter. The catalysts of the present invention may have pores greater than 1 nm in diameter, as long as reactants do not substantially become trapped in the pores. The catalyst support of the present invention may have some micropores, as long as the micropores contribute to less than 10% of the surface area of the support. "Thin shell" is defined herein as a shell with a thickness approximately between 1 to 1000 microns (μm), with a thin shell-to-shell support radius ratio of from about 1/1 to about 1/500. The thickness of the thin shell is preferably between 5 to 1000 microns; more preferably between 5 and 250 microns; and still more preferably between 5 and 100 microns. In some embodiments, the thickness of the thin shell may be between 10 to 1000 microns. When the thin-shell catalyst is employed in a conversion process, the thin-shell catalyst preferably has an effectiveness factor greater than 0.1 under conversion promoting conditions. Another advantage provided by the preferred new catalysts and processes is that they are economically feasible for use under commercial-scale conditions.

In accordance with a preferred embodiment of the present invention, a method for converting a gaseous hydrocarbon to a syngas product includes providing a hydrocarbon oxidation reactor comprising a reaction zone containing a thin shell catalyst, wherein the thin shell catalyst comprises a discrete nonmicroporous support structure and a catalytically active metal, and further wherein a thin shell containing said catalytically active metal is disposed on the discrete nonmicroporous support structure; contacting a reactant gas comprising a $C_1$–$C_5$ hydrocarbon and oxygen over the thin shell catalyst in the reaction zone; and maintaining catalytic oxidation promoting conditions in the reaction zone during the contacting such that a portion of the reactant gas is converted to a product comprising hydrogen and carbon monoxide. As used herein, the term "maintaining catalytic oxidation promoting conditions" refers to regulating hydrocarbon feedstock composition, pressure, space velocity and catalyst temperature and contact time such that the partial oxidation reaction of Equation (2) is favored, when methane is employed as the hydrocarbon.

The catalyst is preferably employed in the reaction zone of a millisecond contact time syngas production reactor. The thin shell catalyst contains a catalytically active metal and a nonmicroporous support.

In accordance with a preferred embodiment of the present invention, a thin shell catalyst comprises a discrete support structure having a characteristic longest dimension between about 0.5 mm and about 6 mm; and a thin layer disposed on said discrete support structure, wherein the thin layer comprises at least one catalytically active metal chosen from the group consisting of nickel, rhodium, iridium, ruthenium, and combinations thereof, and further wherein the thin layer has a thickness between 5 microns and 100 microns.

These and other embodiments, features and advantages of the present invention will become apparent with reference to the following description.

BRIEF DESCRIPTION OF THE DRAWINGS

For a more detailed understanding of the present invention, reference will be made to the accompanying Figures, in which.

DETAILED DESCRIPTION OF PREFERRED EMBODIMENTS

The present invention comprises a new family of syngas production catalysts having a nonmicroporous support coated with a thin shell comprising at least one catalytic material. The present catalysts are capable of catalytically converting $C_1$–$C_5$ hydrocarbons (e.g., methane or natural gas) to synthesis gas containing CO and $H_2$. They are preferably supported on any of various discrete three-dimensional structures. The term "discrete" structure, as used herein, refers to supports in the form of divided materials such as balls, noodles, powders, granules, beads, pills, pellets, cylinders, trilobes, spheres, other rounded shapes, other manufactured configurations, and the like. Alternatively, the divided material may be in the form of irregularly shaped particles. The thin-shell catalyst may comprise different discrete structures, each of which could have a thin shell comprising the same catalytic material or different catalytic material. The thin-shell catalyst may comprise a plurality of identical discrete structures.

It has been discovered that the present new thin shell catalysts, when prepared as described herein, are highly active syngas production catalysts with sufficient mechanical strength to withstand high pressures and temperatures and permit a high flow rate of reactant and product gases when employed on-stream in a short contact time reactor for synthesis gas production. Without wishing to be restricted to a particular theory, the inventors believe that coating the catalytic material on the surface of a nonmicroporous support structure serves to limit secondary reactions and allows for a more efficient use of catalytic material. This theory can be explained by comparing a porous, thin shell catalyst (FIG. 1) to a nonmicroporous, thin shell catalyst (FIG. 2). Preferably, the nonmicroporous support has a surface area of which less than 10% results from the micropores, which are pores with diameter less than 1 nm. When a thin-shell catalyst is made using this nonmicroporous support, the thin-shell catalyst preferably has an effectiveness factor greater than 0.1 in a conversion process under conversion promoting conditions.

Figure 1:
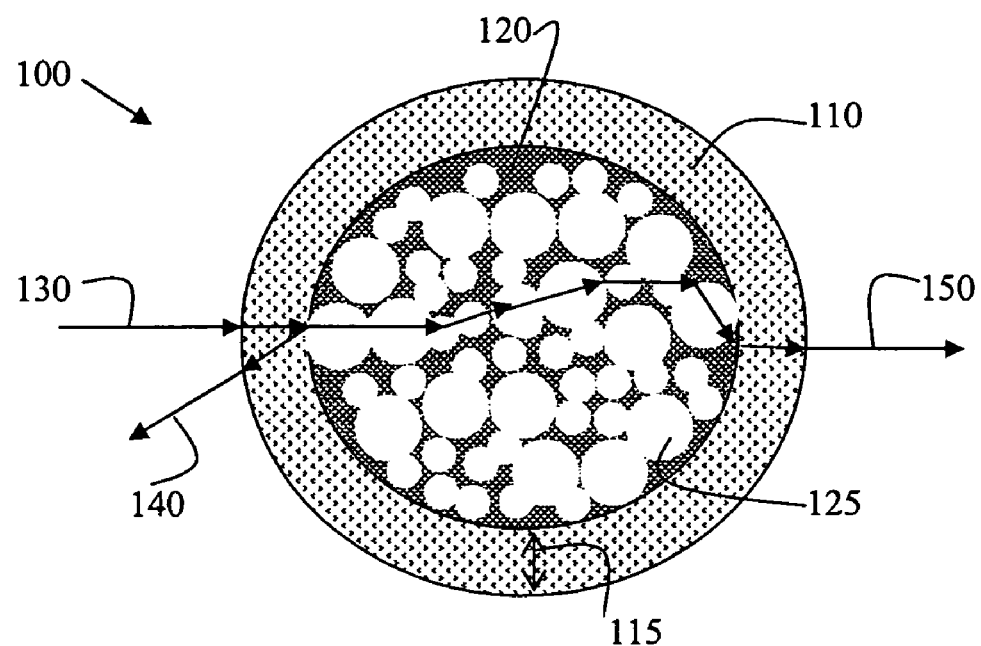
FIG. 1 is a schematic diagram of a porous thin shell catalyst.
Figure 2:
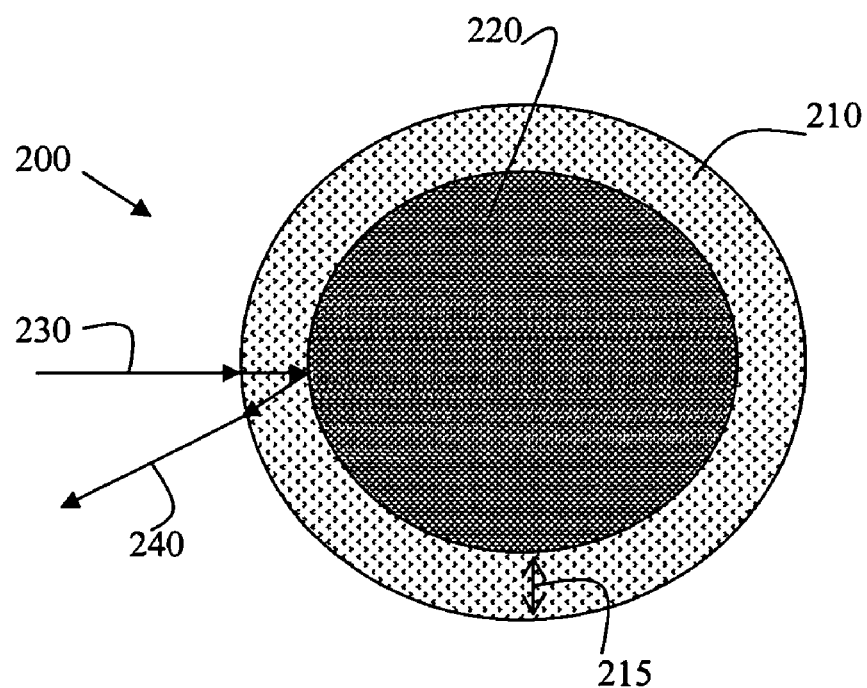
FIG. 2 is a schematic diagram of a nonmicroporous thin shell catalyst.

Referring initially to FIG. 1, a catalyst particle 100 includes a catalytic shell 110 and a porous support or core 120. Initially, reactant stream 130 contacts shell 110 and diffuses through its depth 115 until it reaches core 120. At this stage, a portion of stream 130 may diffuse back across shell 110 and exit the particle as a desirable product 140. However, a portion of stream 130 may continue to diffuse into core 120, via micropores 125. Micropores 125 may entrap the portion of stream 130 long enough for secondary reactions to occur, such as complete oxidation to $CO_2$ and/or oxidative coupling to olefins. In secondary reactions, undesirable products such as carbon dioxide ($CO_2$), water ($H_2O$), ethylene ($C_2H_4$), acetylene ($C_2H_2$) may form. Eventually, these products exit core 120, diffuse back across shell 110, and exit the particle as an undesirable product 150.

Referring now to FIG. 2, catalyst particle 200 includes a catalytic shell 210 and a nonmicroporous support or core 220. Initially, reactant stream 230 contacts shell 210 and diffuses through it until it reaches core 220. At this stage, essentially all of stream 230 diffuses back across shell 210 and exits the particle as a desirable product 240. Because voids or micropores are absent from core 220, the diffusion of components of stream 230 to the core 220 is minimized. Preferably, the nonmicroporous support is fabricated from fused pellets or spheres.

As discussed above, it is desirable for a catalyst to withstand high temperatures. It is also desirable for the catalyst to possess an essentially even intraparticle temperature profile. Maintaining an even temperature profile in the reaction zone within the reactor is desirable because the formation of hot spots is minimized, thus undesired reactions can be prevented, and operations will be much safer due to absence of localized hot spots. Reaction zone depth, and gas space velocity are two factors that can be optimized to provide an even temperature profile within the reactor.

Intraparticle Temperature Profile

In addition to limiting secondary reactions, the use of discrete structures such as particulates and granules allows for a more even temperature profile within the reactor, resulting from an increase in heat transfer rate. Referring back to FIG. 1, which illustrates mass transfer in a porous particle, gas may become trapped in the pores, especially in the micropores, thereby increasing the gas residence time in the pores, and allowing undesirable reactions, such as complete oxidation, to occur. As is known, complete oxidation is highly exothermic; such secondary reaction is expected to cause the intraparticle temperature of the particle to increase at its core, while simultaneously, the particle is heated by the reactant stream(s) flowing along its exterior surface. In contrast, in FIG. 2, which illustrates mass transfer in a nonmicroporous particle, because secondary reactions are prevented or minimized, the intraparticle temperature of the particle at its core is not expected to increase greatly. Thus the particle is heated solely at its exterior surface by the reactant stream. The heat is dissipated relatively quickly with discrete nonmicroporous structures, because of ease of heat transfer from the exterior surface.

Space Velocity

Another important factor related to temperature profile is the gas space velocity, or the ratio of volumetric flow of reactant gas to the total catalyst volume. Selecting an optimum gas space velocity results in a more even temperature profile within the reactor as well as fewer "blowouts" and "blowbacks." Blowouts occur when the space velocity within a reactor is too high and the majority of particles contacting the reactant stream are located at the end (or bottom) of the reactor. Conversely, blowbacks occur when the space velocity within a reactor is too low and the majority of particles contacting the reactant stream are located at the front (or top) of the reactor. Both of these situations are undesirable because they create a large temperature profile within the reactor and make inefficient use of the catalyst system, resulting in poor conversion.

For efficient syngas production, elevated operation pressures are preferred in order to facilitate the direct transition to a downstream process, such as a Fischer-Tropsch process, without the need for intermediate compression or to reduce the compression needs. The use of larger particulates such as granules, spheres, pills with largest dimension of 25 mm or less, may aid in preventing blowouts by a providing a smaller pressure drop in the catalyst bed. Because relative surface area decreases as particle size increases, less catalytic metal is needed to coat the supports, and therefore the cost of the catalyst is reduced. In some preferred embodiments, the particles range from 0.5 to 6 mm in diameter, more preferably from 0.5 to 3 mm in diameter.

Catalyst System

It will be understood that the selection of a catalyst or catalyst system requires many technical and economic considerations. Key catalyst properties include high activity, high selectivity, high recycle capability and filterability. Catalyst performance is determined mainly by the precious metal component. A metal is chosen based both on its ability to complete the desired reaction and its inability to complete an unwanted reaction. Suitable catalytic metals known to aid in syngas conversion including, but not limited to noble metals, d-block transition metals and oxides thereof may be used to coat the supports of the present invention. A suitable noble metal comprises rhodium, iridium, platinum, palladium, and ruthenium. A suitable d-block transition metal or metal oxide comprises nickel. The preferred catalytic metal comprises a metal selected from the group consisting of nickel, rhodium, iridium, ruthenium, and combinations thereof. More preferably, the catalytic metal comprises nickel or rhodium.

A catalyst system according to a preferred embodiment of the present invention may include any nonmicroporous support material. The catalyst support material may be any of a variety of materials onto which a catalytically active material may be coated. The choice of support material is largely determined by the nature of the reaction system. The support material is preferably stable under reaction and regeneration conditions. Further, it preferably does not adversely react with reactants or reaction products. When the catalyst is employed in a partial oxidation process, the catalyst has preferably an effectiveness factor greater than 0.1, more preferably greater than 0.2, still more preferably greater than 0.4 under conversion promoting conditions.

It has been contemplated that any stable metal oxide, refractory, or glass beads or the like may be used for the catalyst support of the present invention. Suitable support materials include but are not limited to: cordierite, cordierite-alpha alumina, silicon nitride, zircon mullite, spodumene, alumina-silica magnesia, zircon silicate, sillimanite, magnesium silicates, zircin, petalite, alpha alumina and aluminosilicates which may be amorphous or crystalline (i.e. alumina-zirconia, alumina-chromia, alumina-ceria, etc.), zirconia, magnesium stabilized zirconia, zirconia stabilized alumina, yttrium stabilized zirconia, calcium stabilized zirconia, titania, silica, magnesia, niobia and vanadia, carbon black, $CaCO_3$, $BaSO_4$, silica-alumina, and alumina. Preferably, the support comprises carbon, alumina, silica, titania, zirconia, silica-alumina, or a combination thereof.

Optionally, the support or catalytic material may contain one or more promoters that enhance catalyst selectivity and performance. Suitable promoters may include, for example, one or more lanthanides. Preferably, the lanthanide is Pr, Nd, Pm, Sm, Eu, Gd, Th, Dy, Ho, Er, Tm or Yb, and more preferably Pr, Sm, and Yb as set forth in U.S. published Patent Application 2002/0115730, with Ser. No. 09/946,305, filed Sep. 5, 2001 and entitled "Lanthanide-promoted Rhodium Catalysts and Process for Producing Synthesis Gas," incorporated herein by reference in its entirety for all purposes.

In some instances, it may be desirable to treat the support, in order to reduce or eliminate microporosity.

As used herein, the terms "distinct" or "discrete" structures or units, as used herein, refer to supports in the form of divided materials such as granules, beads, pills, pellets, cylinders, irregular-shaped particles, pastilles, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than twenty five millimeters, more preferably less than six millimeters, and still more preferably less than three millimeters. When the maximum characteristic length (i.e., longest dimension) of the particles is less than six millimeters, the maximum characteristic length is preferably greater than about 0.5 mm. When the maximum characteristic length (i.e., longest dimension) is less than three millimeters, the maximum characteristic length is preferably greater than about 0.5 mm. Catalytic particles may be made according to methods known in the art such as impregnation and spray drying.

Process for Producing Synthesis Gas

For the production of syngas, any suitable reaction regime may be applied in order to contact the reactants with one of the new nonmicroporous supported catalysts described above. One suitable regime is a fixed bed reaction regime, in which the catalyst is retained within a reaction zone in a fixed arrangement, retained using fixed bed reaction techniques that are well known and have been described in the literature. A hydrocarbon and $O_2$-containing reactant gas mixture is contacted with one of the new nonmicroporous supported thin shell catalysts in a reaction zone maintained at partial oxidation-promoting conditions of temperature, pressure and flow rate, effective to produce an effluent stream comprising carbon monoxide and hydrogen. Preferably a short or millisecond contact time reactor is employed. Several schemes for carrying out catalytic partial oxidation (CPOX) of hydrocarbons in a short contact time reactor have been described in the literature and are known in the art.

Preferably methane and an $O_2$-containing feedstock are combined to provide the reactant gas mixture. Natural gas, or other light hydrocarbons having from 2 to 5 carbon atoms, and mixtures thereof, also serve as satisfactory feedstocks. The $O_2$ containing feedstock is preferably pure oxygen gas, but it may also be air, $O_2$ diluted with a diluent gas such as nitrogen and/or helium, or $O_2$-enriched air. In addition, the oxygen-containing gas may also comprise steam and/or $CO_2$ in addition to oxygen. The reactant gas mixture is fed into a reactor where it comes into contact with a catalytically effective amount of a thin shell catalytic metal carried on a nonmicroporous support. Representative catalysts are described in the foregoing Examples. The reactant gas mixture passes over the catalyst at a gas hourly space velocity of at least about 20,000 $hr^{-1}$, which corresponds to a weight hourly space velocity (WHSV) of about 200 $hr^{-1}$, when the reactor is operated to produce synthesis gas. The hydrocarbon feedstock and/or the oxygen-containing gas may be pre-heated before contacting the catalyst, preferably the reactant gas mixture is pre-heated to a temperature of about 30–700° C., more preferably about 100–500° C. Catalytically inert porous ceramic foam monoliths are preferably placed before and after the catalyst as radiation shields. The inlet radiation shield may also aid in uniform distribution of the feed gases into the catalyst zone.

The reactant gas mixture passes over the catalyst and the catalytic materials are heated to the point at which they ignite and start the reaction. An autothermal net catalytic partial oxidation reaction preferably ensues, and the reaction conditions are managed so as to promote continuation of the autothermal process. For the purposes of this disclosure, the term "net partial oxidation reaction" means that the partial oxidation reaction shown in Reaction (2), above, predominates. However, other reactions such as steam reforming (see Reaction 1), dry reforming (Reaction (3)) and/or water-gas shift (Reaction (4)) may also occur to a lesser extent.

  (3)

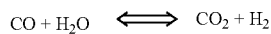  (4)

The relative amounts of the CO and $H_2$ in the reaction product mixture resulting from the catalytic net partial oxidation of the methane, or natural gas, and oxygen feed mixture are about 2:1 $H_2$:CO, similar to the stoichiometric amounts produced in the partial oxidation reaction of Reaction (2). As the preheated feed gas mixture passes over the catalyst to the point at which they ignite, an autothermal net partial oxidation reaction ensues. Preferably, the reaction conditions are maintained to promote continuation of the autothermal net catalytic partial oxidation process.

For the purposes of this disclosure, "autothermal" means that after catalyst ignition, no additional heat must be supplied to the catalyst in order for the production of synthesis gas to continue. Autothermal reaction conditions are promoted by optimizing the concentrations of hydrocarbon and $O_2$ in the reactant gas mixture, preferably within the range of about 1.25:1 to about 3.3:1 molar ratio of carbon:molecular oxygen, more preferably about a 1.3:1 to about 2.5:1, still more preferably of about 1.5:1 to about 2.2:1, and yet still more preferably of about 2:1. The hydrocarbon:oxygen ratio is an important variable for maintaining the autothermal reaction and the desired product selectivities, although maintaining the desired temperature, for example, may in some instances require variation of the carbon:oxygen ratio.

Pressure, residence time, amount of feed preheat and amount of nitrogen dilution, if used, also affect the reaction products. The process preferably includes maintaining a catalyst residence time of no more than approximately 200 milliseconds (ms), preferably no more than 100 ms, more preferably no more than 20 ms, for the reactant gas mixture. This is accomplished by passing the reactant gas mixture over the catalyst at a gas hourly space velocity of about 20,000–100,000,000 $h^{-1}$, preferably about 50,000–6,000,000 $h^{-1}$; more preferably about 100,000–600,000 $h^{-1}$ This range of preferred gas hourly space velocities corresponds to a weight hourly space velocity of about 500 to 60,000 $hr^{-1}$. Under near optimal reaction conditions, a preferred catalyst catalyzes the net partial oxidation of at least 75% of a methane feedstock to CO and $H_2$ with a selectivity for CO and $H_2$ products of at least about 75% CO and 70% $H_2$. Maintaining autothermal reaction promoting conditions may include keeping the temperature of the gas phase at about 600–1,800° C., and preferably between about 600–1,400° C., and maintaining a reactant gas pressure of about 100–12,500 kPa, preferably about 130–10,000 kPa, while contacting the catalyst. Near ideal operating conditions also include mixing a methane-containing feedstock and an $O_2$-containing feedstock together in a carbon:oxygen ratio of about 1.25:1 to about 3.3:1 molar ratio of carbon: molecular oxygen (C:$O_2$), more preferably about a 1.3:1 to about 2.5:1 C:$O_2$, still more preferably of about 1.5:1 to about 2.2:1 C:$O_2$, and yet still more preferably about 2:1 C:$O_2$. Preferably the methane-containing feedstock is at least about 50% methane by volume, more preferably at least 80% methane. Natural gas is mostly methane, but it can also contain up to about 25 mole % ethane, propane, butane and higher hydrocarbons. The new syngas generation process is suitable for the conversion of gas from naturally occurring reserves of methane, which can also contain carbon dioxide, nitrogen, hydrogen sulfide, and other minor components. The product gas mixture emerging from the reactor preferably has a syngas $H_2$:CO ratio suitable as a feed for a hydrocarbon synthesis, such as a Fischer-Tropsch synthesis, and/or suitable for an alcohol synthesis processes. The syngas product has a $H_2$:CO ratio preferably between about 1.5 to about 2.3, more preferably between about 1.6 to about 2.0.

Effectiveness Factor

As is known in the art, the effectiveness factor of a coated catalyst particle depends on the thickness of the outer catalytically active coating layer and the effective diffusion coefficient in the coating layer that is a function of the porosity of the outer coating layer. By controlling the thickness and the porosity of the coating layer, one can vary the effectiveness of the coated nonporous catalyst particles. The concepts disclosed below are known in the art and are disclosed in detail in Levenspiel, O., "*The Chemical Reactor Omnibook*," Ore. St. Univ. Bookstores; (June 1996) and in Kulkarni, M. S. and Dudukovic, M. P., "*Periodic Operation of Asymmetric Bi-directional Fixed-Bed Reactors with Temperature Limitations,*" Ind. Eng. Chem. Res., 37, 770–781 (1998).

As described in Levenspiel (1996), in an isothermal system, for a first order reaction on catalyst particles, one can write the following rate expression:

$$\text{rate} = \eta k' C_{As}$$

where $\eta$=effectiveness factor, $k'$=intrinsic rate coefficient, and $C_{As}$=is the concentration of component A at the particle surface. The effectiveness factor, $\eta$, can be calculated for different shapes of catalyst particles according to the following formulas:

$$\eta = \frac{\tanh M_T}{M_T} \text{ for flat plate particles}$$

$$= \frac{1}{M_T} \cdot \frac{I_1(2M_T)}{I_0(2M_T)} \text{ for cylindrical particles, and}$$

$$= \frac{1}{M_T}\left(\frac{1}{\tanh(3M_T)} - \frac{1}{3M_T}\right) \text{ for spherical particles.}$$

In the forgoing equations, $M_T$ is a Thiele-type modulus $$M_T = L\sqrt{\frac{k'}{D_{\textit{eff}}}},$$

where $k'$ is the intrinsic rate coefficient, $D_{\textit{eff}}$ is the effective diffusion coefficient in porous solids, and L is a characteristic particle size, and $I_1$, and $I_0$ represent Bessel functions. In particular, a characteristic size L of catalyst particle can be calculated by $$L = \text{(Volume of particle)}/\text{(Exterior surface of particle)}$$

$$= \text{Thickness}/2 \text{ (for flat plated)}$$

$$= R/2 \text{ (for cylinder } 2R = H\text{)}$$

= dp/6 (for sphere)

= Thickness of the coating (for coated nonporous particle)

There is negligible resistance to pore diffusion when $M_T < 0.4$ (→η=1.0). Likewise, there is negligible resistance to pore diffusion when $M_T > 4.0$ (→η=1/$M_T$<0.25).

Effectiveness Factor in Methane Oxidation System

The three main reactions that have been taken into account in the "effectiveness factor" modeling below are:

(1) Selective partial oxidation:

$CH_4 + 0.5O_2 = CO + 2H_2$ (exothermic: $\Delta H_1 = -0.356 \times 10^5$ J/mol)

(2) Non selective oxidation (combustion):

$CH_4 + 2O_2 = CO_2 + 2H_2O$ (exothermic, $\Delta H_2 = -8.03 \times 10^5$ J/mol)

(3) Steam reforming:

$CH_4 + H_2O = CO + 3H_2$ (endothermic: $\Delta H_3 = 2.06 \times 10^5$ J/mol)

In a non-isothermal reactor system, such as is typically employed in methane oxidation to form syngas, the effectiveness factor for the first-order reaction is given as a function of Thiele-type modulus ($M_T$), the Arrhenius number (α), and a heat of reaction parameter (β) in methane oxidation system:

$$\eta_i = \frac{1}{M_{Ti}} \exp(-\alpha_i \beta_i / 5) \quad \text{for } M_T > 2.5$$

where $M_{Ti} = L \sqrt{\frac{k'_i}{D_{eff_i}}}$; $\alpha_i = \frac{Ea_i}{RT_s}$; $\beta = \frac{(-\Delta H_s)_i D_{eff_i} C_{p,s}}{\lambda_s T_s}$.

For purposes of illustration only, a set of effectiveness factors were calculated for both porous supported catalyst and non-porous supported catalyst. The transport and kinetics parameters given in Kulkami and Dudukovic, (1998) were adopted in this modeling. The results are set out in Tables 1 and 2.

TABLE 1

Calculated Effectiveness Factor for Porous Supported Catalyst

| | dp (mm) | | | | |
|---|---|---|---|---|---|
| | 0.5 | 1.0 | 1.5 | 2.0 | 3.0 |
| | Effectiveness factor (η) | | | | |
| Partial oxidation | 0.045 | 0.022 | 0.015 | 0.011 | 0.007 |
| Combustion | 0.217 | 0.109 | 0.072 | 0.054 | 0.036 |
| Steam reforming | 1.000 | 1.000 | 0.908 | 0.681 | 0.454 |

TABLE 2

Calculated Effectiveness Factor for Three Reactions for Nonmicroporous Supported Catalysts using 1 mm support particles

| | Coating layer Thickness (μm) | | | | |
|---|---|---|---|---|---|
| | 5 | 10 | 20 | 50 | 100 |
| | Effectiveness factor (η) | | | | |
| Partial oxidation | 0.905 | 0.453 | 0.226 | 0.091 | 0.030 |
| Combustion | 1.000 | 1.000 | 0.906 | 0.363 | 0.181 |
| Steam reforming | 1.000 | 1.000 | 1.000 | 1.000 | 1.000 |

The data in the Tables confirm that controlling the coating thickness and coating porosity in a nonmicroporous supported catalyst (it was assumed that there was no substantial diffusion of gas in the 1 mm core) can control the effectiveness factor of the catalyst particles under reaction conditions. In Table 1, as the diameter of support particle decreases, the effectiveness factor increases for all three main types of reactions to convert hydrocarbons. For partial oxidation reactions, the effectiveness factor of the porous catalyst particles (i.e., mass transfer resistance) is particularly poor compared to those of combustion and steam reforming for the same particle size. In order to achieve an effectiveness factor greater than 0.045, the particle size would have to be less than 0.5 mm for a partial oxidation catalyst.

The catalyst's effectiveness factor can be greatly increased in another manner by using a thin layer on a nonmicroporous support. Table 2 shows the effect of the thickness of the layer on 1-mm diameter nonmicroporous support particles on the effectiveness factor of the catalyst, again for all 3 main types of processes. Again as the layer thickness decreases, the effectiveness factor increases, particularly for combustion and partial oxidation. The effectiveness factor for the partial oxidation nonmicroporous supported catalyst was increased by 1.3-fold to 41-fold using a layer thickness from 100 microns to 5 microns respectively, as compared to that obtained with the same 1-mm particle size of porous support in Table 1. The data confirm that a non-microporous supported catalyst can offer a high effectiveness factor for methane partial oxidation without using very small particle sizes. Bigger particles size is more desirable in a fixed, bed reactor, because bigger particles do not cause a high pressure-drop in the fixed bed as small particles do, which in turn improves the process economics. Lastly, by shifting the active metal components from interior surface to exterior surface of the particles, one can significantly improve the active metal utilization.

EXAMPLES

The following examples are offered by way of illustration, and not by way of limitation. Those skilled in the art will recognize that variations of the invention embodied in the examples can be made, especially in light of the teachings of the various references cited herein, the disclosures of which are incorporated by reference.

A preferred support material was fused alpha-alumina pills. The catalysts were prepared according to the following procedure, given here for laboratory-scale batches.

Example 1

Ni—MgO Supported on Alpha-Alumina Pills.

An amount (4.40 grams) of $Mg(NO_3)_2 \cdot 6H_2O$ and an amount (8.61 grams) of $Ni(NO_3)_2 \cdot 6H_2O$ were dissolved in 15 grams of distilled-deionized (DDI) water at about 50–60° C. The solution was added in small portions to about 12.50 grams of 6–12 (1.7–3.4 mm) mesh fused alumina pills, and mixed well.

The mixed material was dried at about 60° C. with intermittent stirring, dried in a convection oven with air flow at 110° C. and calcined in air according to the following schedule: 3° C./min ramp up to 200° C.; hold at 200° C. for 1 hour; 3° C./min ramp up to 400° C.; hold at 400° C. for 1 hour; 3° C./min ramp up to 900° C.; hold at 900° C. for 2 hours; 5 C/min ramp down to room temperature. The resulting material contained Mg oxide loading of 5.5 g and Ni loading of 13.5 g based on a 100-g weight of $Al_2O_3$ pills.

The catalyst was reduced with $H_2$ using 1:1 by volume flow of $N_2:H_2$ mixture at 0.3 standard liter per minute (SLPM), where standard conditions of temperature and pressure are 0° C. and 1 atm, using the following schedule: 3° C./min ramp up to 125° C.; hold at 125° C. for 0.5 hour; 5° C./min ramp up to 500° C.; hold at 500° C. for 3 hours; 5° C./min ramp down to room temperature. The resulting composition comprised 13.5 g Ni, 5.5 g MgO on a 100-g weight of alumina (11.3 wt % Ni and 4.6 wt % MgO, with the remainder of the weight being alumina). Scanning electron microscopy confirms that the particles comprise fused alpha-alumina support particles having diameters of about 2000 microns, with a coating layer on each comprising a thin shell catalyst coating of MgO having a shell thickness of about 50 microns.

Example 2

Ni—MgO Supported on Alpha/Gamma-Alumina Extrudates

An amount (7.94 grams) of $Mg(NO_3)_2 \cdot 6H_2O$ was dissolved in an amount (8 grams) of DDI water at about 80° C. The solution was added to 25 grams of 1 mm D×5 mm L $Al_2O_3$ extrudates, and mixed well.

The material was dried at about 70–80° C. with intermittent stirring, and calcined in air according to the following schedule: 3° C./min ramp up to 125° C.; hold at 125° C. for 1 hour; 3° C./min ramp up to 250° C.; hold at 250° C. for 1 hour; 3° C./min ramp up to 500° C.; hold at 500° C. for 3 hours; 5° C./min ramp down to room temperature. The resulting material contained Mg oxide loading of 1.594 grams or 6.40 g MgO based on a 100-g weight of $Al_2O_3$ extrudates (or the MgO-coated $Al_2O_3$ extrudates had a loading of 6 wt % MgO, with the remainder being alumina).

An amount (7.8 grams) of $Ni(NO_3)_2 \cdot 6H_2O$ was dissolved in 10 grams of DDI water at about 80° C. and the solution was added to an amount (10.33 grams) of the MgO-coated $Al_2O_3$ extrudates. The 10.33 grams of MgO-coated $Al_2O_3$ extrudates comprised 9.71 g alumina and 0.62 g MgO.

The material was dried at about 80° C. and calcined in air according to the following schedule: 5° C./min ramp up to 125° C.; hold at 125° C. for 1 hour; 5° C./min ramp up to 400° C.; hold at 400° C. for 2 hours; 5° C./min ramp up to 900° C.; hold at 900° C. for 3 hours; 5° C./min ramp down to room temperature. The resulting material contained NiO loading of 2.051 grams, which corresponds to 21.1 g NiO based on a 100-g weight of $Al_2O_3$ extrudates.

The catalyst was reduced with $H_2$ using 1:1 by volume flow of $N_2:H_2$ mixture at 0.3 standard liter per minute (SLPM), using the following schedule: 3° C./min ramp up to 125° C.; hold at 125° C. for 0.5 hour; 5° C./min ramp up to 500° C.; hold at 500° C. for 3 hours; 5° C./min ramp down to room temperature. The resulting composition comprised 16.6 g Ni, 6.4 g MgO based on a 100-g weight of $Al_2O_3$ extrudates (or 13.5 wt % Ni, 5.2 wt % MgO with the remainder being alumina).

Example 3

Ce—Ni—MgO Supported on Alpha/Gamma-Alumina Extrudates.

An amount (5.0476 grams) of $Ni(NO_3)_2 \cdot 6H_2O$ was dissolved in 5.2 grams of DDI water at about 80° C. and the solution was added to 6.65 grams of the MgO-coated 1 mm D×5 mm L $Al_2O_3$ extrudates (from EX.2). The 6.65 grams of MgO-coated $Al_2O_3$ extrudates comprised 6.25 g alumina and 0.4 g MgO.

The material was dried at about 80° C. and calcined in air according to the following schedule: 5° C./min ramp up to 125° C.; hold at 125° C. for 1 hour; 5° C./min ramp up to 400° C.; hold at 400° C. for 2 hours; 5° C./min ramp up to 900° C.; hold at 900° C. for 3 hours; 5° C./min ramp down to room temperature. The resulting material contained NiO loading of 1.1452 grams, which corresponds to 18.3 g NiO based on a 100-g weight of $Al_2O_3$ extrudates (the NiO—MgO coated alumina had a composition of 14.7 wt % NiO, 5.1 wt % MgO, and 80.2 wt % alumina).

An amount (0.5 gram) of $Ce(NO_3)_3 \cdot 6H_2O$ was dissolved in 3 grams of DDI water at about 80C and the solution was added to 7.8 grams of NiO—MgO-coated $Al_2O_3$ extrudates. The 7.8 grams of NiO—MgO-coated $Al_2O_3$ extrudates comprised 6.26 g alumina, 1.15 g NiO, and 0.4 g MgO.

The material was dried at about 80° C. and calcined in air according to the following schedule: 3° C./min ramp up to 125° C.; hold at 125° C. for 1 hour; 3° C./min ramp up to 250° C.; hold at 250° C. for 1 hour; 3° C./min ramp up to 500° C.; hold at 500° C. for 3 hours; 5° C./min ramp down to room temperature. The resulting material contained Ce oxide loading of 0.2059 grams, which corresponds to 3.29 g Ce oxide based on a 100-g weight of $Al_2O_3$ extrudates.

The catalyst was reduced with $H_2$ using 1:1 by volume flow of $N_2:H_2$ mixture at 0.3 standard liter per minute (SLPM) measured at 0° C. and 1 atm pressure, using the following schedule: 3° C./min ramp up to 125° C.; hold at 125° C. for 0.5 hour; 5° C./min ramp up to 500° C.; hold at 500° C. for 3 hours; 5° C./min ramp down to room temperature. Resulting composition: 2.68 g Ce, 14.4 g Ni, 6.4 g MgO, on a 100-g weight of $Al_2O_3$ extrudates (or 11.7 wt % Ni, 2.2 wt % Ce, 5.2 wt % MgO, and 81 wt % alumina).

The materials made according to the foregoing Examples were tested as described below. Specifically, the catalyst system of Example 1 was tested using Test Procedure 1, while the catalyst systems of Examples 2 and 3 were tested using Test Procedure 2.

Test Procedure 1

A partial oxidation reaction was carried out in a conventional flow apparatus using a 44 mm O.D.×38 mm I.D. quartz insert embedded inside a refractory-lined steel vessel. The quartz insert contained a catalyst bed containing the particulate catalyst (~37 mm O.D.×10–15 mm high) held between two foam disks. The upper disk typically consisted of 65-ppi partially-stabilized zirconia and the bottom disk typically consisted of 30-ppi zirconia-toughened alumina. Preheating the methane or natural gas that flowed through the catalyst bed provided the heat needed to start the reaction. Oxygen was mixed with the methane or natural gas immediately before the mixture entered the catalyst bed. The methane or natural gas was spiked with propane, or another combustable gas, as needed to initiate the partial oxidation reaction, then the propane was removed as soon as the reaction initiated. Once the reaction was initiated, it proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated. The product gas mixture was analyzed for $CH_4$, $O_2$, CO, $H_2$, $CO_2$ and $N_2$ using a gas chromatograph equipped with a thermal conductivity detector. A gas chromatograph equipped with a flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst monolith evaluated in this test system are considered predictive of the conversion and selectivities that will be obtained when the same catalyst is employed in a commercial scale short contact time reactor under similar conditions of reactant concentrations, temperature, reactant gas pressure and space velocity.

Test Procedure 2

Representative nonmicroporous supported catalysts were evaluated for their ability to catalyze the partial oxidation reaction in a conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The inlet radiation shield also aided in uniform distribution of the feed gases. An Inconel®-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a $CH_4$:$O_2$ molar ratio of 2:1 with a combined gas hourly space velocity of about 150,000–1,300,000 $hr^{-1}$ and at a pressure of between 5 and 45 psig (136 and 412 kPa). The reactor effluent was analyzed using a gas chromatograph equipped with a thermal conductivity detector. The test results are shown below in Table 1.

TABLE 1

| EX. | P (psig) | Preheat T (° C.) | Catalyst T (° C.) | GHSV (1/hr) | $O_2$/$CH_4$ molar ratio | $CH_4$/$O_2$ conversion (%) | CO/$H_2$ selectivity (%) | $H_2$:CO molar ratio |
|---|---|---|---|---|---|---|---|---|
| 1 | 45 | 320 | 1084 | 1,224,000 | 0.5402 | 77.4/99.6 | 78.5/70.4 | 1.71 |
| 2 | 5 | 303 | 782 | 187,847 | 0.5515 | 88.5/99.3 | 96.0/90.2 | 1.88 |
| 3 | 5 | 299 | 767 | 180,438 | 0.5480 | 88.8/99.3 | 95.9/87.9 | 1.83 |

It can be seen that using nonmicroporous fused alpha-alumina or less-porous gamma/alpha-alumina extrudates supports, syngas performance of ~77% $CH_4$ conversion and 79% CO and 70% $H_2$ selectivity at 45 psig pressure, and of ~89% $CH_4$ conversion and 96% CO and 90% $H_2$ selectivity at ambient pressure can be achieved. From FIG. 1, it can also be seen that the ratio of catalyst thin layer to support particle size is only 1:40, indicating the very small amount of catalyst surface used to achieve the performance shown for Example 1. It is an object of this invention that through controlling the porosity of the support, catalyst layer thickness and catalyst composition improved syngas performance can be achieved using desired mass transfer of reactants to and products from the catalyst. It is also an object of this invention that such enhanced mass transfer be achievable at short contact time conditions, thus making such catalysts suitable for industrial processes.

While the preferred embodiments of the invention have been shown and described, modifications thereof can be made by one skilled in the art without departing from the spirit and teachings of the invention. The embodiments described herein are exemplary only, and are not intended to be limiting. For example, pure methane was employed in the representative test procedures, however, any light hydrocarbon (i.e., $C_1$–$C_5$) gaseous feedstock could also serve as a feedstock for the catalytic partial oxidation reaction catalyzed by the new nonmicroporous, thin shell catalysts. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications, and publications cited herein are incorporated by reference.

What is claimed is:

1. A method for converting a gaseous hydrocarbon to a syngas product, the method comprising:
   providing a hydrocarbon oxidation reactor comprising a reaction zone containing a thin shell catalyst, wherein the thin shell catalyst comprises a discrete nonmicroporous support structure and a catalytically active metal, wherein said thin shell catalyst has an effectiveness factor greater than 0.1 while under catalytic oxidation promoting conditions, and further wherein a thin shell containing said catalytically active metal is disposed on the discrete nonmicroporous support structure;

contacting a reactant gas comprising a $C_1$–$C_5$ hydrocarbon and oxygen over the thin shell catalyst in the reaction zone; and maintaining catalytic oxidation promoting conditions in the reaction zone during the contacting such that at least 75% of the reactant gas is converted to a product comprising hydrogen and carbon monoxide.

2. The method according to claim 1 wherein said support structure has a characteristic longest dimension less than 25 mm.

3. The method according to claim 2 wherein said thin shell catalyst has an effectiveness factor greater than 0.2.

4. The method according to claim 2 wherein said thin shell catalyst has an effectiveness factor greater than 0.4.

5. The method according to claim 1, wherein the product has a $H_2$:CO molar ratio between 1.5 and 2.3.

6. The method according to claim 1, wherein the product further comprises $C_1$–$C_5$ olefins.

7. The method of claim 1 wherein the nonmicroporous support comprises a material selected from the group consisting of glass, metal oxides, refractory material, metal carbides, metal nitrides, and combinations thereof.

8. The method of claim 1 wherein the nonmicroporous support structure comprises a refractory material.

9. The method of claim 8 wherein the refractory material is selected from the group consisting of cordierite, cordierite-alpha alumina, silicon nitride, zircon mullite, spodumene, alumina-silica magnesia, zircon silicate, sillimanite, magnesium silicates, zircin, petalite, alpha alumina and aluminosilicates, zirconia, magnesium stabilized zirconia, zirconia stabilized alumina, yttrium stabilized zirconia, calcium stabilized zirconia, titania, silica, magnesia, niobia and vanadia, carbon black, $CaCO_3$, $BaSO_4$, silica-alumina, alumina, and combinations thereof.

10. The method of claim 8 wherein the refractory material is selected from the group consisting of carbon, alumina, silica, titania, zirconia, silica-alumina, and combinations thereof.

11. The method of claim 1 wherein the discrete nonmicroporous support structure is a particulate.

12. The method of claim 1 wherein the discrete nonmicroporous support structure comprises at least one geometry selected from the group consisting of powders, particles, pellets, granules, spheres, beads, pills, balls, noodles, cylinders, irregularly-shaped particles, pastilles, extrudates and trilobes.

13. The method of claim 1 wherein the thin shell catalyst comprises a plurality of discrete structures, and wherein at least a majority of the discrete structures each have a maximum characteristic length of less than 25 millimeters.

14. The method of claim 13 wherein the majority of the discrete structures have a maximum characteristic length of less than about six millimeters.

15. The method of claim 13 wherein the discrete structures have a maximum characteristic length between about 0.5 mm and about 6 mm.

16. The method of claim 1 wherein the support structure is generally spherical and the ratio of the thickness of the catalyst thin shell to the radius of the support structure is less than 1:1.

17. The method of claim 1 wherein the thickness of the catalyst thin shell is between about 1 to about 1000 microns (μm).

18. The method of claim 1 wherein the thickness of the catalyst thin shell is between about 5 to about 100 microns (μm).

19. The method of claim 1 wherein the contacting step comprises contacting a reactant gas mixture comprising the hydrocarbon and a source of oxygen with the catalyst at a gas hourly space velocity of at least about 20,000 $h^{-1}$.

20. The method of claim 1 wherein the contacting step comprises contacting a reactant gas mixture comprising the hydrocarbon and a source of oxygen with the catalyst at a gas hourly space velocity between about 100,000 $h^{-1}$ and 6,000,000 $h^{-1}$.

21. The method of claim 1 wherein the step of maintaining the catalyst at catalytic oxidation promoting conditions during the contacting includes maintaining a gas temperature of about 600–1,800° C.

22. The method of claim 1 wherein the step of maintaining catalytic oxidation promoting conditions during the contacting includes maintaining a pressure of about 130–10,000 kPa.

23. The method of claim 1 further comprising mixing a methane-containing feedstock and an $O_2$-containing feedstock to provide a reactant gas having a C:$O_2$ molar ratio of about 1.25:1 to about 3.3:1.

24. The method of claim 1 wherein the $C_1$–$C_5$ hydrocarbon comprises at least about 50% methane by volume.

* * * * *